Figure 1:
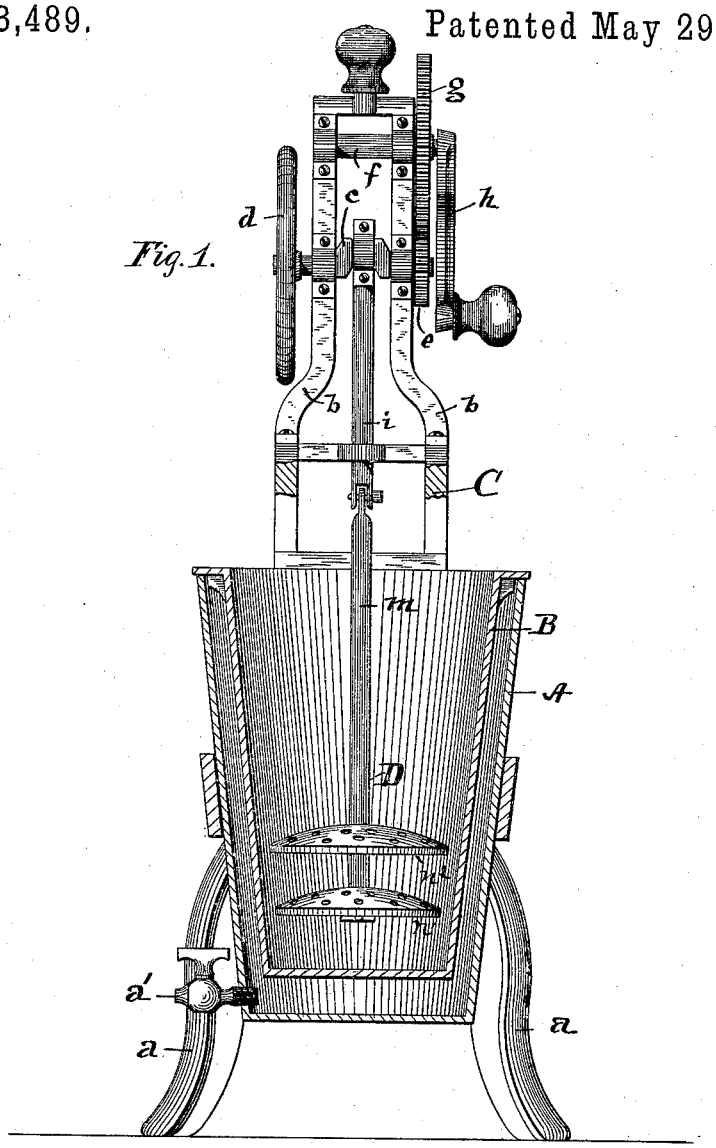

(No Model.) 2 Sheets—Sheet 1.

D. PETERS.
EGG BEATER.

No. 383,489. Patented May 29, 1888.

Witnesses:
W. C. Jirdinston.
C. D. Kerr.
C. C. Lowrie.

Inventor:
Daniel Peters.
by Raul Horea,
Attorney.

(No Model.) 2 Sheets—Sheet 2.
D. PETERS.
EGG BEATER.
No. 383,489. Patented May 29, 1888.
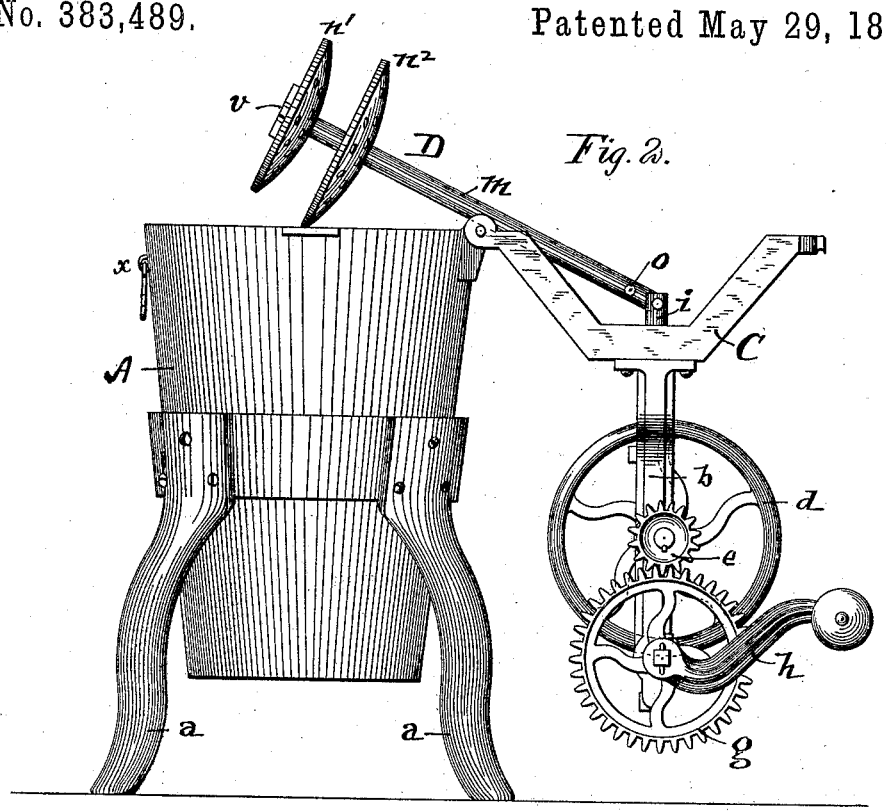
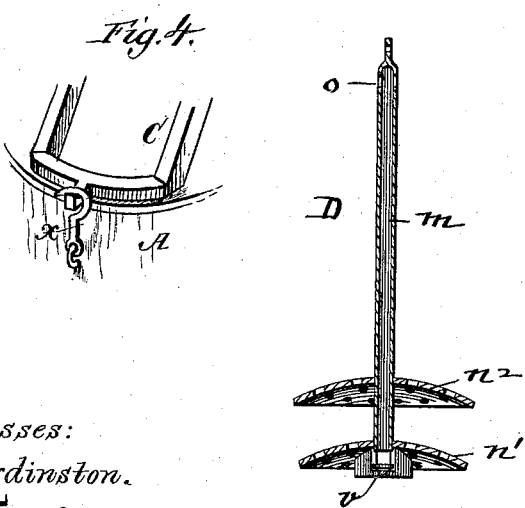
Witnesses:
W. C. Jirdinston.
C. D. Kerr
C. C. Lownie
Inventor:
Daniel Peters,
by Reu Hosea
Attorney.

UNITED STATES PATENT OFFICE.

DANIEL PETERS, OF CINCINNATI, OHIO.

EGG-BEATER.

SPECIFICATION forming part of Letters Patent No. 383,489, dated May 29, 1888.

Application filed November 9, 1885. Serial No. 182,233. (No model.)

*To all whom it may concern:*

Be it known that I, DANIEL PETERS, a citizen of the United States, residing at Cincinnati, Ohio, have invented new and useful Improvements in Egg-Beaters, of which the following is a specification.

My invention relates to egg-beaters, its object being to produce a simple, practicable, and efficient device for use in bakeries, confectioneries, &c., where eggs are beaten in quantities.

To this end my invention consists in the apparatus and mechanism hereinafter more fully described.

My invention is illustrated in the accompanying drawings, in which—

Figure 1 is a vertical elevation of the complete apparatus sectioned through the containing-vessels. Fig. 2 is a vertical side elevation of the same, showing the beating mechanism detached and thrown back in position for removal, cleansing, &c. Fig. 3 is a sectional view of the beater or "aerator" detached from its reciprocating mechanism. Fig. 4 is a detail view.

Referring now to the drawings, A designates an outer vessel for containing water, and B a removable inner vessel for containing the egg-yelks or other substance to be aerated or "beaten." The outer vessel is mounted upon a suitable support—such, for example, as legs $a$—and is furnished with a faucet, $a'$, for drawing off the contents, water being placed in the outer vessel to regulate the temperature of the contents of the inner vessel. The form of the vessel is not essential, but cylindrical or slightly-conical forms are to be preferred. Mounted, upon the outer vessel is a frame, C, hinged at one side of the margin of the outer vessel and secured by a detachable fastening, such as the hook and staple fastening $x$ shown at the other. Between and through the vertical posts $b\ b$, constituting the upper portion of the frame, is journaled a crank-shaft, $c$, which may be provided with a fly-wheel, $d$, at one projecting end and a spur-pinion, $e$, at the other, and above the crank-shaft is suitably journaled a driving-shaft, $f$, provided with a spur-gear, $g$, meshing with the pinion $e$, and with a handle, $h$, or power connections for driving.

To the wrist of the crank $c$ is attached a pitman, $i$, extending downward and guided in an eye or opening of the frame C, and to the lower end of the pitman is attached the beater D. The beater consists of a hollow plunger, $m$, having one or more air-openings, $o$, near the top and a valve, $v$, seating upward, closing the aperture at the bottom. In close proximity to the bottom of the plunger $m$ are attached two concave perforated disks or dashers, $n'\ n^2$, one above the other—the lower being somewhat the smaller—arranged with their concaved sides downward.

Thus constructed the operation is as follows: By the action of the driving mechanism the plunger and beater are reciprocated vertically in the contents of the inner vessel. At each lift of the beaters air is drawn through the hollow plunger into the material beneath the plungers to supply the partial vacuum, and by the downward thrust of the beaters this is forced outward and disseminated through the mass.

The temperature is regulated by supplying hot or cold water to the outer vessel.

When the operation is concluded, the frame C is tilted back into the position indicated in Fig. 2, which brings the beater D into convenient position for cleansing or for removal by disconnecting it from the pitman $i$, and also permitting the removal of the inner vessel, B.

The inner vessel may be omitted and the beater operated directly in the outer vessel.

I claim as my invention and desire to secure by Letters Patent of the United States—

The improved egg-beater consisting of the vessel A, and arched frame C, hinged to the upper margin of the containing-vessel at one side and extending to and detachably fastened at the opposite side, the upper extensions, $b\ b$, of said arched frame, the crank-shafts $c$ and $f$, journaled in and between said extensions and provided with intermeshing gears $g\ e$, the pitman $i$, extended through the arched frame C as a guide, and the detachable plunger D, combined and arranged substantially as set forth.

In testimony whereof I have hereunto set my hand in the presence of two subscribing witnesses.

DANIEL PETERS.

Witnesses:
L. M. HOSEA,
C. D. KERR.